(No Model.)

E. ROBINSON.
COOKING APPARATUS.

No. 254,050. Patented Feb. 21, 1882.

Attest
Jno. E. Wiles
Wm. P. Tyrrell

Inventor
Edgar Robinson
by Wood & Boyd
his Attorneys

UNITED STATES PATENT OFFICE.

EDGAR ROBINSON, OF CINCINNATI, OHIO.

COOKING APPARATUS.

SPECIFICATION forming part of Letters Patent No. 254,050, dated February 21, 1882.

Application filed November 21, 1881. (No model.)

*To all whom it may concern:*

Be it known that I, EDGAR ROBINSON, a citizen of the United States, and a resident of Cincinnati, in the county of Hamilton and State of Ohio, have invented certain new and useful Improvements in Cooking Apparatus, of which the following is a specification.

My invention relates to an improvement in cooking apparatus, and more particularly to that class which employs a detachable series, seating one into the other, and employing steam to supply the several vessels for heating and cooking purposes, all of which will be set forth and described in the description of the accompanying drawings.

Figure 1:
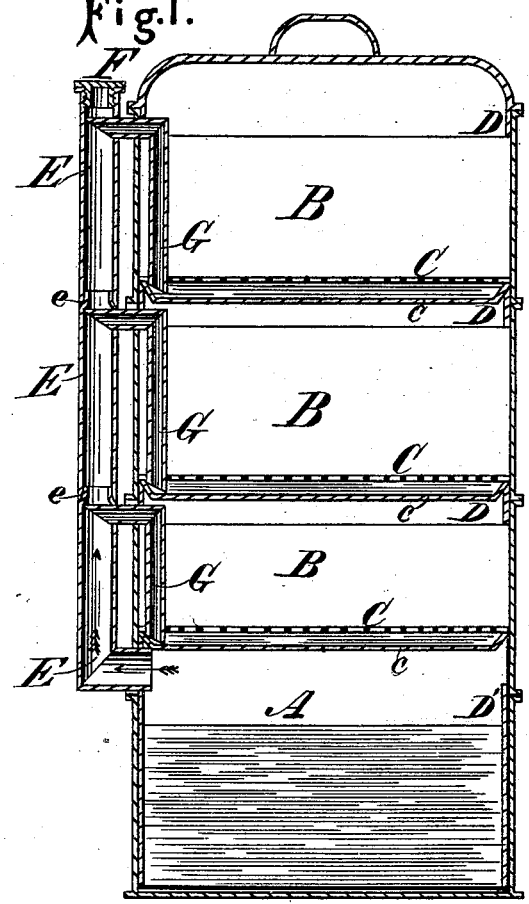
Figure 2:
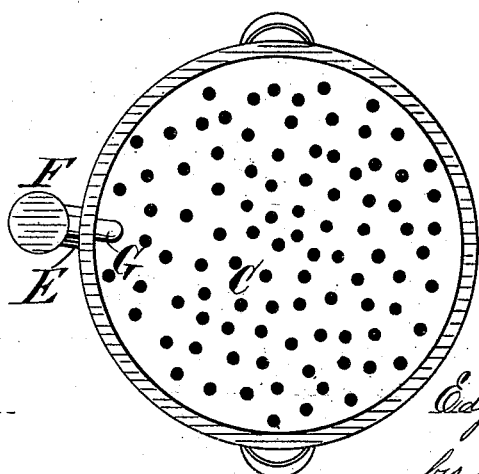

In the accompanying drawings, Figure 1 is a central vertical section of my improved cooking-vessel, showing the arrangement of the steam-supply or feed tubes. Fig. 2 is a plan view of same with the lid removed, and showing the perforated false bottom and the feed-tubes.

A is the lower vessel or steam-chamber, in which is placed the water from which is generated the steam for cooking purposes.

B B B are the cooking vessels or pans, in which the food is placed.

C C C are the false perforated bottoms of the vessels or pans B; c c c, the real or true bottoms of pans B.

D D D' are flanges on the bottoms of pans B, and which slide down into the pan next below, so as to make the joint tight. The flange D' on the bottom of the lower cooking-pan extends down to near the bottom of the water or steam chamber A, so to form a water seal.

E is the jointed steam-supply pipe leading from the steam-chamber A.

F is a screw-cap, which closes the mouth of pipe E.

G G G are removable pipes, which pass through openings in the walls of the cooking-pans and into openings in the tube E, and also extend down inside the pans B to a point below the false bottoms C, and prevent the escape of steam from the vessels when it is once inside. The ends of these pipes G are beveled off, so as to form oblique mouths to more readily conduct the steam into the cooking-vessels B.

I obtain several important advantages by having the outside sectional supply-pipe, E. First, I am enabled to make the supply-pipe permanent and extensible at pleasure as each vessel is added, and also, by the tapping of the pipes G in the manner shown, an appropriate quantity of steam is carried into each vessel B, which obviates the objection experienced in many cooking devices of supplying too much to the top and but little to the bottom cooking-vessel.

A material advantage is derived from having the pipes G project down to a point near the bottom of the vessels B, so that the mouths of the pipes will be immersed in water, so as to keep the flavor or the steam from passing back into the supply-pipe E and into the other vessels.

The false bottom C keeps the articles to be cooked from coming in contact with the water which forms the water seal to the mouth of the pipe G. It is not necessary to place water in the bottoms of pans B when the cooking operation is started, as the condensation of the steam soon forms a water seal.

The water seal formed by the downward extension of the cylinder or flange D' into a body of water is important, as it prevents any escape of the steam around the joint between the lower pan and the boiler and forces the steam all up through the pipe E. The extent of downward extension of cylinder D' is not material, except to have it at all times below the surface of the water in the boiler A.

I claim—

1. A cooking apparatus composed substantially of the water-boiler A and one or more cooking-vessels, B, having the outside sectional supply-pipes E, and a secondary intersecting supply-pipe, G, substantially as herein set forth.

2. A cooking apparatus composed substantially of water-boiler A, cooking-vessels B, having the outside supply-pipe, E, and a secondary intersecting supply-pipe, G, extending below the false bottom C and terminating near the real bottom c, so as to form the water seal, substantially as set forth.

3. The sectional removable cooking-pan B, having a permanent outside supply-pipe, E, and the intersecting supply-pipe G, projecting into pipe E, substantially as described.

In testimony whereof I have hereunto set my hand in the presence of two subscribing witnesses.

EDGAR ROBINSON.

Witnesses:
JOHN E. JONES,
JNO. E. WILES.